May 4, 1937.                L. G. RONDELLE                2,079,183
                       AUTOMOBILE MOTOR ATTACHMENT
                          Filed Sept. 25, 1931

INVENTOR.
Louis G. Rondelle
BY Miller Boyken Bried
ATTORNEYS.

Patented May 4, 1937

2,079,183

UNITED STATES PATENT OFFICE 2,079,183

AUTOMOBILE MOTOR ATTACHMENT

Louis G. Rondelle, San Francisco, Calif.

Application September 25, 1931, Serial No. 565,013

4 Claims. (Cl. 248—7)

This invention relates to means for overcoming objectionable engine vibration on automobiles, and the object of the invention is to provide means particularly adapted to cooperate with the existing structure on a Ford Model A car for the above mentioned purpose. Another object of the invention is to provide simple inexpensive means which may be quickly and easily applied to a Ford car and which may be easily adjusted to produce the maximum beneficial results.

Other objects and advantages of the invention will appear in the following description and accompanying drawing.

In the drawing Fig. 1 is a front elevation of a portion of the engine of a Ford Model A automobile and supporting frame brace showing the invention applied thereto.

Before describing the invention it would be well to state that in the Model A Ford the engine, clutch housing, transmission housing and universal housing, are all secured together as a rigid unit and that this unit is supported at its forward end in a cradle on two springs from a frame cross member, and at the rear portion of the engine by brackets bolted to the chassis frame with rubber interposed.

In the construction described, and which is familiar to the majority of the motoring public there is set up a very objectionable vibration from the engine which results in a body roar at critical engine speeds so that comfort and conversation are made impossible, and it is to overcome this vibration that the special apparatus to be described has been invented.

Figure 1:
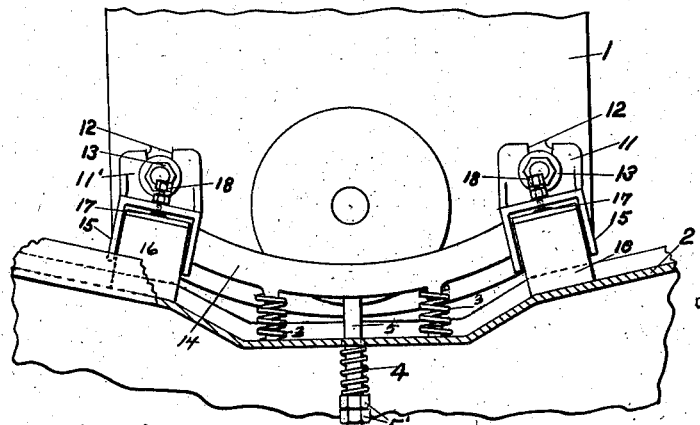
Figure 3:
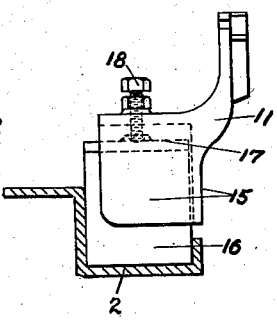
Fig. 3 is an enlarged side view of one of the special brackets of Fig. 1.

In Fig. 1 of the drawing 1 is the engine casing, 2 the front channel-shaped cross member supporting the forward part of the engine on springs 3, stabilized by another spring 4 around a downwardly extending tension bolt 5 provided with nuts 5' for adjusting the tension on the springs. A cradle member 14 lies between the springs and engine casing.

Figure 2:
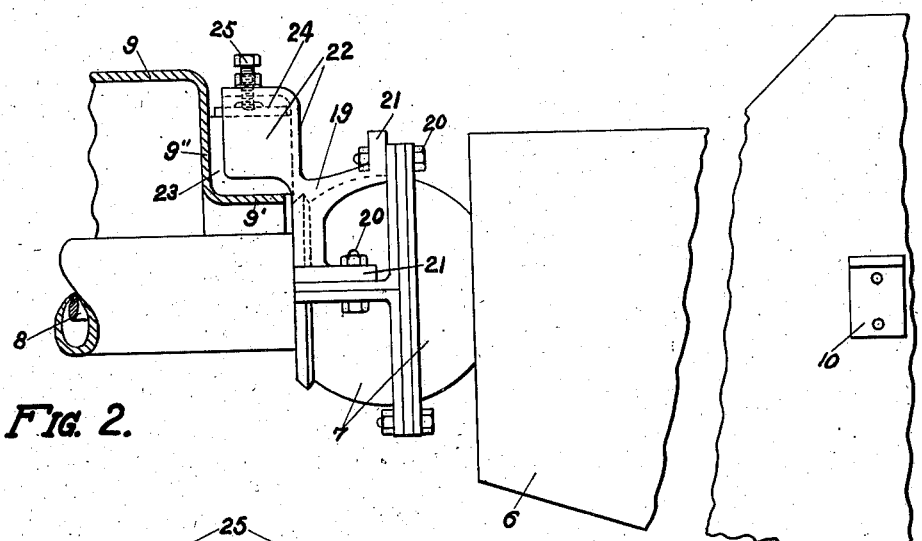
Fig. 2 is a side elevation of the rear end of the engine assemblage or transmission and universal housings showing the invention applied.
Figure 4:
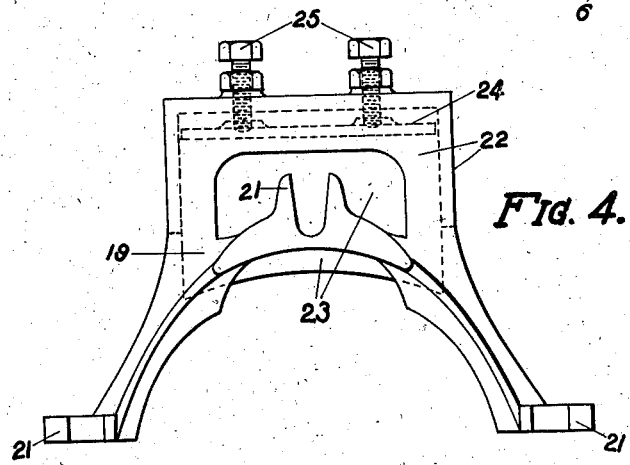
Fig. 4 is an enlarged front view of the special bracket of Fig. 2.

In Fig. 2 of the drawing 6 is the transmission housing, 7 the universal joint housing, 8 the propeller shaft, 9 the cross frame member of Z shape which passes over and clear of the driving mechanism and joins the two side members of the chassis frame (not shown).

Also to be considered is the rearward engine supporting brackets which extend to the frame and the position of which on both sides of the engine is about as indicated at 10.

All the above numbered parts are old and well known construction of the Model A Ford.

The present invention supplements the support of the engine and takes up all vibration and consists of (Figs. 1 and 2) a pair of special bracket castings 11, 11' made right and left and formed with open-ended slots 12 to slide under existing bolt nuts 13 located at opposite front corners of the engine which secure it to the cradle 14, and which brackets are each formed with a downwardly directed open pocket having three walls 15 embracing a large rectangular block of tough resilient rubber 16 which rests firmly against the top of the frame cross member 2, with two opposed sides against the sides of the channel, the single bolt slot 12 permitting adjustment to bring the lower end of the rubber block square against the angularly disposed portion presented by the cross member at this point.

Within each bracket pocket is a loose plate 17 of metal impinged on top by a tight fitting set screw 18 threaded through the top of the bracket and by means of which the rubber block may be forced downward to bring a considerable compression on the rubber and equalize both sides.

At the rearward end of the engine assemblage is a special bracket 19 firmly bolted to the universal joint housing 7 by three bolts 20 through slotted lugs 21, and existing flange bolt holes in the universal housing. This bracket is also provided with a downwardly directed open pocket, but it is defined by three walls 22 making it open in back as well as at the bottom. The pocket of the bracket is arranged just above the lower horizontally extending leg 9' of Z bar transverse frame member and within the pocket is a large block of tough resilient rubber 23 formed to fit both against the lower leg 9' as well as the vertical wall 9" of the Z bar frame member. Within the pocket of the bracket above the rubber block is a loose plate 24 of metal against which impinge two set screws 25, threaded through the top of the pocket wall, and by means of which a pressure may be put upon the rubber to carry a substantial portion of the engine assemblage load.

By the provision of the three special brackets in the positions and operating as described, an adjustable resilient upward strain may be applied to the engine assemblage at the three spaced points described, and which cooperating with the existing resilient supports effectually absorbs so much of the engine vibration as to make the four cylinder Ford engine run with substantially the smoothness of a six cylinder machine.

I am aware of course that rubber suspension of an engine is not broadly new, but I believe my simple means of applying it to an existing Ford car is new, and therefore I claim:—

1. Means for overcoming objectional vibration in an automobile having an engine mounted over a chassis frame which comprises a pair of brackets adapted to attach to the forward lower corners of the engine assemblage, a block of resilient rubber in a pocket formed in each bracket adapted to fit within the front cross member of the chassis frame, said blocks of rubber having their sides exposed so as to contact a vertical wall of said member.

2. The combination with an automobile frame having a front cross member and a motor on the frame, of an auxiliary vibration dampening support consisting of a pair of brackets rigidly secured to the front of the motor, within the confines of the front end of the motor casing and divergently depending therefrom, the lower ends of said brackets having lateral ears, cushions cooperative with and between the ears and said front cross member and diverging co-axially with the ears and means holding said ears and the cushions in assembled relation on said cross member, thereby providing compensating means for vibrations of the motor due to torque movement.

3. The combination with an automobile frame having a front cross member and a motor on the frame, of an auxiliary vibration dampening support consisting of a pair of brackets secured to the front of the motor within the confines of the front end of the motor casing and divergently depending therefrom, the lower ends of said brackets having lateral ears, cushions cooperative with and between the ears and said front cross member and diverging coaxially with the ears and means holding said ears and the cushions in assembled relation on said cross member, thereby providing compensating means for vibrations of the motor due to torque movement.

4. Means for overcoming objectionable vibration in an automobile having an engine mounted over a chassis frame which comprises a pair of brackets adapted to attach to the forward lower corners of the engine assemblage, a pocket provided in the under side of each bracket and a block of rubber engaging in each of said pockets adapted to rest on the front cross frame member.

LOUIS G. RONDELLE.